USU008583420B2

(12) United States Patent
Tanev

(10) Patent No.: US 8,583,420 B2
(45) Date of Patent: Nov. 12, 2013

(54) METHOD FOR THE EXTRACTION OF RELATION PATTERNS FROM ARTICLES

(75) Inventor: Hristo Tanev Tanev, Varese (IT)

(73) Assignee: The European Community, Represented by The European Commission (BE)

( * ) Notice: Subject to any disclaimer, the term of this patent is extended or adjusted under 35 U.S.C. 154(b) by 794 days.

(21) Appl. No.: 12/595,936

(22) PCT Filed: Apr. 15, 2008

(86) PCT No.: PCT/EP2008/054558
§ 371 (c)(1),
(2), (4) Date: Feb. 8, 2010

(87) PCT Pub. No.: WO2008/125676
PCT Pub. Date: Oct. 23, 2008

(65) Prior Publication Data
US 2010/0138216 A1   Jun. 3, 2010

(30) Foreign Application Priority Data

Apr. 16, 2007 (EP) .................................. 07106252

(51) Int. Cl.
*G06F 17/27* (2006.01)
*G06F 17/21* (2006.01)

(52) U.S. Cl.
USPC ................................................ 704/9; 704/10

(58) Field of Classification Search
USPC ........................................................ 704/9–10
See application file for complete search history.

(56) References Cited

U.S. PATENT DOCUMENTS

| | | | | |
|---|---|---|---|---|
| 6,836,761 | B1 * | 12/2004 | Kawashima et al. | 704/258 |
| 6,968,331 | B2 * | 11/2005 | Bar-Yossef et al. | 1/1 |
| 7,254,577 | B2 * | 8/2007 | Gupta et al. | 1/1 |
| 7,475,008 | B2 * | 1/2009 | Jensen et al. | 704/9 |
| 8,195,634 | B2 * | 6/2012 | Kumar et al. | 707/706 |
| 8,200,617 | B2 * | 6/2012 | Spivack et al. | 707/602 |
| 2005/0202392 | A1 * | 9/2005 | Allen et al. | 434/362 |
| 2006/0026157 | A1 * | 2/2006 | Gupta et al. | 707/6 |
| 2007/0255555 | A1 * | 11/2007 | Crouch et al. | 704/9 |
| 2008/0085502 | A1 * | 4/2008 | Allen et al. | 434/365 |
| 2010/0268720 | A1 * | 10/2010 | Spivack et al. | 707/756 |

OTHER PUBLICATIONS

Nathalie Aussennac-Giles, et al: "Designing and Evaluating Patterns for Ontolgy Enrichment form Texts", 2006 Managing Knowledgement in a World of Networks Lecture Notes in Computer Science; Lecture Notes in Artificial Intellig Ence; LNCS, Sprongers, Berlin, DE, pp. 158-165.
European Search Report Application No. 08736245.5-1527 dated Jan. 8, 2013; 5 pages.
Aron Culotta, et al; "Dependency Tree Kernels for Relation Extraction"; Proceedings of the 42nd Annual Meeting of the ACL, 2004.
Dmitry Zelenko, et al.; "Kernel Methods for Relation Extraction"; Journal of machine learning research 2003, vol. 3, No. 6, pp. 1083-1106.
Florian Beil, et al.; "Frequent Term-Based Text Clustering", 2002.
Idan Szpektor, et al.; "Scaling Web-based Acquisition of Entailment Relations"; In Proceedings of Emnlp-04—Empirical Methods in Natural Language Processing, [Online] Jul. 25, 2004; Jul. 26, 2004 XP002450934; Retrieved from the Internet: URL:http://tanev.dir.bg/EMNLP04.pdf>[retrieved on Sep. 14, 2007].
Ido Dagan, et al.; "Probabilistic Textual Entailment: Generic Applied Modeling of Language Variability"; Dagan and Glickman 2004.
Regina Barzilay, et al.; "Learning to Paraphrase: An Unsupervised Approach Using Multiple-Sequence Alignment"; Proceedings of HLT-NAACL, Main Papers, pp. 16-23, Edmonton, May-Jun. 2003.
Yusuke Shinyama, et al.; "Automatic Paraphrase Acquistion from News Articles" Proceedings of Human Language Technology Conference, [Online] Mar. 24, 2002; Mar. 27, 2002 XP002450935 San Diego, USA; Retrieved from the Internet: URL:http://citeseer.ist.psu.edu/555041.htm [retrieved on Sep. 4, 2007].
International Search Report; PCT/EP2008/054558; Jul. 4, 2008.

* cited by examiner

*Primary Examiner* — Samuel G Neway
(74) *Attorney, Agent, or Firm* — Cantor Colburn LLP

(57) ABSTRACT

A method for building a knowledge base containing entailment relations is proposed. The proposed method makes use of an automatic or semi-automatic procedure to learn iteratively patterns for specific relations using clusters of similar articles. For each considered relation a user provides a system with one or several pivot patterns or input patterns, and the system returns patterns which express the same meaning in different ways.

26 Claims, No Drawings

METHOD FOR THE EXTRACTION OF RELATION PATTERNS FROM ARTICLES

TECHNICAL FIELD OF THE INVENTION

The present invention generally relates to the technical field of natural language processing and more specifically to a method and system for the extraction of relation patterns from natural language documents.

BRIEF DESCRIPTION OF RELATED ART

Expressing one thing in other words, or "paraphrasing", plays an important role in the variety and complexity of natural language documents. One can express a single event in thousands of ways in natural language sentences. A creative writer uses lots of paraphrases to state a single fact. This greatly adds to the difficulty of natural language processing.

Modelling this semantic variability in language has drawn a lot of attention in recent years. Many natural language applications, such as Information Retrieval, Machine Translation, Question Answering, Text Summarization, or Information Extraction, have to recognize that the same meaning can be expressed in the text in a huge variety of surface forms. Substantial research has been dedicated to acquiring paraphrase patterns, which represent various forms in which a certain meaning can be expressed.

Besides the paraphrase pattern, there exist relationships, which are not exactly paraphrases, but are nonetheless related and are potentially useful to information retrieval systems. For example "X acquired Y" entails "X owns Y". It follows that a somewhat more general notion needed for a lot of applications is that of "entailment relations". These "entailment relations" (which include paraphrase pattern) are directional relations between two expressions, where the meaning of one can be entailed from the meaning of the other. These relations provide a broad framework for representing and recognizing semantic variability, as proposed in (Dagan and Glickman, 2004). For example, if a Question and Answer system has to answer the question "Who owns YouTube®?" and the corpus includes the phrase "Google® acquired YouTube®", the system can use the known entailment relation to conclude that this phrase really indicates the desired answer.

To perform such inferences at a broad scale, applications need to possess a large knowledge base (KB) of entailment patterns. Traditionally, knowledge bases containing such entailment relations are created manually. However, this knowledge engineering task is extremely laborious. More importantly, building such a knowledge base is inherently difficult since humans are not good at generating a complete list of rules.

Various methods have been disclosed in the past for learning relations which use kernel methods, e.g. by Zelenko Dmitry, Aone Chinatsu, Richardella Anthony "Kernel Methods for Relation Extraction", Journal of machine learning research, 2003, vol. 3, no 6, pp. 1083-1106 or by A Culotta, J Sorensen, "Dependency tree kernels for relation extraction", Proceedings of the 42nd Annual Meeting of the ACL, 2004". Their common disadvantage is the need for manually annotated training data and slow relation detection (each pair of entities is tested). Another important disadvantage is that the output of the machine-learning algorithm is very difficult, if not impossible to be understood and manipulated by a human expert.

Barzilay and Lee (Barzilay, Lee, "Learning to Paraphrase: an unsupervised approach using multiple sequence alignment", Proceedings of HLT-NAACL 2003) present an unsupervised linear-pattern approach, which relies on aligned sentences. Since it is not easy to find many similar sentences, the coverage of this approach has limitations. Another unsupervised pattern learning Web-based approach is described in Szpektor, Tanev, Dagan, Coppola, "Scaling Web-based Acquisition of Entailment Relations", Proceedings of EMNLP 2004. The use of the web guarantees good coverage, however the speed is limited by the speed of the public search engines.

BRIEF SUMMARY OF THE INVENTION

The invention provides an improved method for the extraction of relation patterns from articles.

In order to overcome the above-mentioned problem, the present invention proposes a method for forming entailment relations; comprising a) providing at least one input pattern (p) with N pattern slots (N>1), said input pattern (p) expressing a specific semantic relation between N entities that fill the N pattern slots of the input pattern (p) as slot fillers, b) providing at least one cluster (c) of articles, said articles of said cluster (c) relating to a common main topic;

c) processing said articles with respect to the input pattern (p) and identifying the identities which match the semantic type of the N pattern slots;

d) if said at least one input pattern matches a portion of an article (a) of said at least one cluster (c), i.e. if all the parts of the pattern are matched in the text fragment and all the N slots match text entities from the corresponding type:

i) storing the N slot fillers $(s_1, s_2, \ldots, s_N)$, which match the slots of the pattern (p), and a cluster identifier $I_c$ of the cluster (c) into a first table S, wherein the N-tuple $(s_1, s_2, \ldots, s_N)$ and the cluster identifier $I_c$ of the associated cluster (c) form one element of table S;

ii) for each element of table S, identifying appearances of the slot fillers $(s_1, s_2, \ldots, s_N)$ in a plurality of articles of cluster (c) and for each appearance so identified, storing the slot fillers $(s_1, s_2, \ldots, s_N)$ together with the sentence in which they occur into a second table $C_0$;

iii) from the sentences stored in table $C_0$, extracting patterns which span over the corresponding N slot fillers $(s_1, s_2, \ldots, s_N)$, said extracted pattern expressing a semantic relation between said N slot fillers; and iv) forming an entailment relation between said extracted patterns and said input pattern.

The proposed method makes use of an automatic or semi-automatic procedure to learn iteratively patterns for specific relations using clusters of similar articles. For each considered relation the user provides the system with one or several pivot patterns or input patterns, and the system returns patterns, which express the same meaning in different ways. The main advantages of the proposed method lie in the facts that:

patterns are faster than approaches based on kernel methods pattern learning from article clusters is faster than similar pattern learning approaches which use the Web, this makes feasible to perform many learning iterations which improves the coverage using clusters of articles brings higher precision. In fact, expressions considered as paraphrases are different from domain to domain. Even if two expressions can be regarded as the same meaning in a certain domain, it is not possible to generalize them to other domains. In the present method, the input pattern is matched with articles from one cluster, i.e. with articles having a similar topic and thus relating to the same domain. It follows that the entailment rules, which are identified by the method relate to a specific domain.

the user can define the relation from which he or she is interested

In a first embodiment of the invention, the input pattern (p) is a linear pattern. In another embodiment, the input pattern (p) is a syntactic pattern and said articles are syntactically parsed prior to the processing of said articles with respect to the input pattern (p) in c).

The proposed method accepts on its input one or more syntactic or linear patterns P with N slots (N>1) which express a specific semantic relation R. For example, two syntactic patterns for the relation "criticize" can be:

$$PERSON_1 \leftarrow subj\text{---}criticized\text{---}obj \rightarrow PERSON_2$$

$$PERSON_1 \leftarrow subj\text{---}is\_an\_opponent\text{---}of \rightarrow PERSON_2$$

Syntactic patterns are syntactic trees which have two or more slots. Each slot can be filled with a specific entity type. In the example above, slots are designated with PERSON1 and PERSON2; they can be filled just by names of type person. Syntactic templates are matched against syntactic trees, so they are not dependent on the linear word order and the additional words, which can appear in-between. For example, the first pattern will match phrases like "John Adams, president of ABC Corp., criticized sharply his colleague Adam Howard."

The algorithm may accept also linear patterns like PERSON1 criticized PERSON2.

Unlike the syntactic patterns, the linear ones depend on the word order and the words between. For example, the linear pattern above matches only phrases like "John Adams criticized Adam Howard", but will not match "John Adams criticized sharply Adam Howard".

In a possible variant of the method, an entire set P of input patterns (p) with N pattern slots (N>1) is provided in step a), and the extracted pattern is added to the pattern set (P). In this case, the set of pattern (P) forms a sort of knowledge base containing a plurality of different patterns, which express a specific fact in different ways. Likewise a set (C) of clusters (c) of articles (a) may be provided as input, wherein each of said clusters (c) contains one or more articles relating to a common main topic.

Depending on the number of articles in the cluster of interest and on the desired quality of pattern extraction, the method for forming entailment relations may use only a part of the cluster in order to identify appearances of the slot fillers the articles or the entire cluster. If e.g. a cluster contains a high number of articles, it may be sufficient to identify the occurrence of the slot filler N-tuple only in a part of the articles and nevertheless end up with high quality pattern extraction. In an another embodiment of the method, the appearances of the slot fillers ($s_1, s_2, \ldots, s_N$) are identified throughout all the articles of cluster (c) in ii). This ensures that the coverage of the relation extraction is maximized.

It will be appreciated, that in iii) each slot filler or entity is preferably substituted by a slot variable so as to generate patterns which generally span over a plurality of slot fillers. Furthermore prior to iv), each extracted pattern preferably is weighted with respect of the number of sentences and the number of slot filler N-tuples which support the respective extracted pattern, and only those extracted patterns, for which the weight exceeds a predetermined threshold, are further considered in iv). This selection of highly weighted patterns increases the quality of the entailment relation extraction in that only those pattern are outputted and added to the knowledge base, which are likely to indicate topical rather than accidental occurrences of pattern p.

It will be appreciated, that the method of the present invention may operate fully automatically and unsupervised. On the other hand, there is a possibility of human intervention in the learning process. In fact, in a variant of the method, a human expert can assess the appropriateness of the newly extracted and/or added patterns.

It will further be appreciated, that the present invention also relates to a method for building a knowledge base containing entailment relations, comprising the steps of extracting entailment relations from a corpus (articles) in accordance of the method as described hereinabove; and storing said extracted pattern together with said input pattern as entailment relation into said knowledge base. Such a method for building a knowledge base containing entailment relations, therefore comprises the steps of:

a) providing at least one input pattern (p) with N pattern slots (N>1), said input pattern (p) expressing a specific semantic relation between N entities that fill the N pattern slots of the input pattern (p) as slot fillers, b) providing at least one cluster (c) of articles, said articles of said cluster (c) relating to a common main topic;

c) processing said articles with respect to the input pattern (p) and identifying the identities which match the semantic type of the N pattern slots;

d) if said at least one input pattern matches a portion of an article (a) of said at least one cluster (c):

i) storing the N slot fillers ($s_1, s_2, \ldots, s_N$), which match the slots of the pattern (p), and a cluster identifier Ic of the cluster (c) into a first table S, wherein the N-tuple ($s_1, s_2, \ldots, s_N$) and the cluster identifier $I_c$ of the associated cluster (c) form one element of said table S;

ii) for each element of table S, identifying appearances of the slot fillers ($s_1, s_2, \ldots, s_N$) in a plurality of articles of cluster (c) and for each appearance so identified, storing the slot fillers ($s_1, s_2, \ldots, s_N$) together with the sentence in which they occur into a second table $C_0$;

iii) from the sentences stored in table $C_0$, extracting patterns which span over the corresponding N slot fillers ($s_1, s_2, \ldots, s_N$), said extracted pattern expressing a semantic relation between said N slot fillers; and iv) storing said extracted patterns together with said input pattern as entailment relation into said knowledge base.

DETAILED DESCRIPTION OF THE INVENTION

The algorithm described here is a bootstrapping iterative machine learning algorithm which allows for human intervention (in step 9). The goal of the algorithm is to produce a set of patterns, which paraphrase the patterns given as an input. The method exploits clusters of similar documents. Since the human intervention is optional the algorithm can work both in unsupervised and in supervised modes.

Step 1: The algorithm accepts on its input one or more syntactic or linear patterns p (or a set P of such patterns) with N slots (N>1) which express a specific semantic relation R. For example, two syntactic patterns for the relation "criticize" can be:

$$PERSON_1 \leftarrow subj\text{---}criticized\text{---}obj \rightarrow PERSON_2$$

$$PERSON_1 \leftarrow subj\text{---}is\_an\_opponent\text{---}of \rightarrow PERSON_2$$

Syntactic patterns are syntactic trees, which have two or more slots. Each slot can be filled with a specific entity type.

In the example above, slots are designated with $PERSON_1$ and $PERSON_2$; they can be filled just by names of type person. Syntactic templates are matched against syntactic trees, so they are not dependent on the linear word order and the additional words which can appear in-between. For example, the first pattern will match phrases like "John Adams, president of ABC Corp., criticized sharply his colleague Adam Howard."

The algorithm may accept also linear patterns like
$PERSON_1$ criticized $PERSON_2$
Unlike the syntactic patterns, the linear ones depend on the word order and the words between. For example, the linear pattern above matches only phrases like "John Adams criticized Adam Howard", but will not match "John Adams criticized sharply Adam Howard"

Step 2: Another input for the pattern learning algorithm is a set C of clusters c of articles a. In each cluster one or more articles must be present whose main topic is the same. Clustering can be done using word similarity between articles. Different clustering algorithms are described in the literature (see for example "Frequent term-based text clustering" from Beil, Ester, and Xu).

Step 3: a) Articles are processed linguistically with respect to the type of patterns to be learned. If we are to learn syntactic trees, the articles should be parsed syntactically.

b) The entities which match the type of the pattern slots should be identified. If we take as an example the patterns in Step 1, then we have to identify all the person names. Tools for Named Entity (NE) recognition or dictionaries like WordNet (http://wordnet.princeton.edu) can be used at this stage.

Step 4: The patterns p in the set P are matched against the articles in the set C of clusters c. A pattern matches a text fragment or a syntactic tree, if all its parts are matched and all the N slots match text entities from the corresponding types.

When a pattern p from P matches a text fragment in some article a which belongs to the cluster c from C, the algorithm stores in a table S the N slot fillers $(s_1, s_2, \ldots s_N)$ matched by the slots of the pattern and the cluster identifier $I_c$ of c. Since the patterns p from P express the relation R, this relation will hold for $(s_1, s_2, \ldots s_N)$.

Step 6: For each element of S, comprising N-tuple $(s_1, s_2, \ldots s_N)$ of slot-fillers and a reference $I_c$ to a cluster c of articles a, we search all the appearances of the slot fillers in all the articles of the cluster c. We consider only the co-occurrences of $(s_1, s_2, \ldots s_N)$ in one sentence. For each such co-occurrence we create a row in a new table $C_0$, where we store the N-tuple of slot-fillers and the sentence where they co-occur.

Note that the slot fillers were initially extracted from only one article a from c and now we search their co-occurrence in the whole cluster c. As we pointed out in point 5, R holds for the slot fillers in a. Moreover, since all the articles in a cluster refer to the same topic, it is reasonable to assume that the relation R holds for the slot filler N-tuple in the whole cluster c. For example, if in one article of the cluster c it is stated that "John Adams criticized Adam Howard", it is reasonable to assume that in most of the cases when John Adams and Adam Howard appear together in some article from the cluster c, they are related via the "criticize" relation.

Step 7: From the sentences in table $C_0$ extract patterns (linear or syntactic) which span over the corresponding N slot fillers. Each slot filler in the pattern is substituted by a slot designation. The type of each slot is equal to the type of the slot filler. Different approaches for pattern extraction (both for linear and syntactic patterns) are described in the literature (see for example "Scaling Web-based Acquisition of Entailment Relations" from Szpektor, Tanev, Dagan, and Coppola).

Step 8: Each pattern extracted in step 7 is weighted considering the number of sentences and the number of slot-filler tuples from $C_0$ which support it. A sentence or a slot-filler tuple supports a pattern when the pattern appears in the sentence or spans over the slot-filler tuple.

Step 9: The patterns whose weight is over a certain threshold (absolute or relative with respect to the highest weight) are added to the pattern set P, if they do not exist there. If relevant, a human expert can assess the appropriateness of the newly added patterns.

Step 10: If the set of patterns P was not expanded in 9 or its size is over a certain threshold, then stop the iteration and return P as a result. Otherwise go to step 4.

The invention claimed is:

1. A method for forming entailment relations; comprising
   a) providing to a computer device at least one input pattern (p) with N pattern slots, wherein N is an integer greater than 1, said input pattern (p) expressing a specific semantic relation between N entities that fill the N pattern slots of the input pattern (p) as slot fillers $(s_1, s_2, \ldots, s_N)$,
   b) providing to the computer device at least one cluster (c) of articles, said articles of said cluster (c) relating to a common main topic;
   c) processing, by the computer device, said articles with respect to the input pattern (p) and identifying identities of said articles which match a semantic type of the N pattern slots;
   d) based on determining that said at least one input pattern matches a portion of at least one of said articles of said at least one cluster (c):
      i) storing the N slot fillers $(s_1, s_2, \ldots, s_N)$, which match the slots of the pattern (p), and a cluster identifier $I_c$ of the cluster (c) into a first table S, wherein an N-tuple $(s_1, s_2, \ldots, s_N)$ and the cluster identifier $I_c$ of the associated cluster (c) form one element of table S;
      ii) for each element of table S, identifying, by the computer device, appearances of the slot fillers $(s_1, s_2, \ldots, s_N)$ in a plurality of articles of the cluster (c) and for each appearance so identified, storing the slot fillers $(s_1, s_2, \ldots, s_N)$ together with a sentence in which they occur into a second table $C_0$;
      iii) from the sentences stored in table $C_0$, extracting, by the computer device, patterns which span over the corresponding N slot fillers $(s_1, s_2, \ldots, s_N)$, said extracted pattern expressing a semantic relation between said N slot fillers; and
      iv) forming, by the computer device, an entailment relation between said extracted patterns and said input pattern.

2. The method for forming entailment relations according to claim 1, wherein said input pattern (p) is a linear pattern.

3. The method for forming entailment relations according to claim 1, wherein said input pattern (p) is a syntactic pattern and wherein said articles are syntactically parsed prior to the processing of said articles with respect to the input pattern (p) in c).

4. The method for forming entailment relations according to claim 1, wherein a set P of input patterns (p) with N pattern slots (N>1) is provided, and wherein the extracted pattern is added to the pattern set P.

5. The method for forming entailment relations according to claim 1, wherein a set (C) of clusters (c) of articles (a) is provided as input, and wherein each of said clusters (c) contains one or more articles relating to a common main topic.

6. The method for forming entailment relations according to claim 1, wherein in ii) the appearances of the slot fillers ($s_1$, $s_2$, ..., $s_N$) are identified throughout all the articles of cluster (c).

7. The method for forming entailment relations according to claim 1, wherein in iii) each slot filler or entity is substituted by a slot variable.

8. The method for forming entailment relations according to claim 1, wherein prior to iv), each extracted pattern is weighted with respect of the number of sentences and the number of slot filler N-tuples which support the respective extracted pattern, and wherein only those extracted patterns, for which the weight exceeds a predetermined threshold, are further considered in iv).

9. The method for forming entailment relations according to claim 1, further comprising an assessment of the appropriateness of the entailment relation between said extracted pattern and said input pattern by human intervention.

10. A method for building a knowledge base containing entailment relations, comprising the steps of:
   a) providing at least one input pattern (p) with N pattern slots (N>1), said input pattern (p) expressing a specific semantic relation between N entities that fill the N pattern slots of the input pattern (p) as slot fillers,
   b) providing at least one cluster (c) of articles, said articles of said cluster (c) relating to a common main topic;
   c) processing, by a computer device, said articles with respect to the input pattern (p) and identifying the identities which match the semantic type of the N pattern slots;
   d) if said at least one input pattern matches a portion of an article (a) of said at least one cluster (c):
      i) storing, by the computer device, the N slot fillers ($s_1$, $s_2$, ..., $s_N$), which match the slots of the pattern (p), and a cluster identifier $I_c$ of the cluster (c) into a first table S, wherein the N-tuple ($s_1$, $s_2$, ..., $s_N$) and the cluster identifier $I_c$ of the associated cluster (c) form one element of said table S;
      ii) for each element of table S, identifying, by the computer device, appearances of the slot fillers ($s_1$, $s_2$, ..., $s_N$) in a plurality of articles of cluster (c) and for each appearance so identified, storing the slot fillers ($s_1$, $s_2$, ..., $s_N$) together with the sentence in which they occur into a second table $C_0$;
      iii) from the sentences stored in table $C_0$, extracting, by the computer device, patterns which span over the corresponding N slot fillers ($s_1$, $s_2$, ..., $s_N$), said extracted pattern expressing a semantic relation between said N slot fillers; and
      iv) storing, by the computer device, said extracted patterns together with said input pattern as entailment relation into said knowledge base.

11. The method for building a knowledge base containing entailment relations according to claim 10, wherein said input pattern (p) is a linear pattern.

12. The method for building a knowledge base containing entailment relations according to claim 10, wherein said input pattern (p) is a syntactic pattern and wherein said articles are syntactically parsed prior to the processing of said articles with respect to the input pattern (p) in c).

13. The method for building a knowledge base containing entailment relations according to claim 10, wherein a set (P) of input patterns (p) with N pattern slots (N>1) is provided, and wherein the extracted pattern is added to the pattern set (P).

14. The method for building a knowledge base containing entailment relations according to claim 10, wherein a set (C) of clusters (c) of articles (a) is provided as input, and wherein each of said clusters (c) contains one or more articles relating to a common main topic.

15. The method for building a knowledge base containing entailment relations according to claim 10, wherein in ii) the appearances of the slot fillers ($s_1$, $s_2$, ..., $s_N$) are identified in all the articles of cluster (c).

16. The method for building a knowledge base containing entailment relations according to claim 10, wherein in iii) each slot filler or entity is substituted by a slot variable.

17. The method for building a knowledge base containing entailment relations according to claim 10, wherein prior to iv), each extracted pattern is weighted with respect of the number of sentences and the number of slot filler N-tuples which support the respective extracted pattern, and wherein only those extracted patterns, for which the weight exceeds a predetermined threshold, are further considered in iv).

18. The method for building a knowledge base containing entailment relations according to claim 10, further comprising an assessment of the appropriateness of the entailment relation between said extracted pattern and said input pattern by human intervention.

19. A computer program product stored on a non-transitory computer usable medium, comprising instructions operable to cause a programmable processor to carry out a method for generating forming entailment relations according to claim 1.

20. Computer device comprising:
   memory means having program code stored therein for performing all the steps of a method according to claim 1, and
   an execution environment for executing said program code so as to carry out a method according to claim 1.

21. A computer program product stored on a non-transitory computer usable medium, comprising instructions operable to cause a programmable processor to carry out a method for building a knowledge base containing entailment relations according to claim 10.

22. A computer program product stored on a non-transitory computer usable medium comprising program code for performing all the steps of the method according to claim 9 when said program is run on a computer.

23. A computer program product stored on a non-transitory computer usable medium comprising program code for performing all the steps of the method according to claim 18 when said program is run on a computer.

24. Computer device comprising:
   memory means having program code stored therein for performing all the steps of a method according to any one of the claim 9, and
   an execution environment for executing said program code so as to carry out a method according to claim 9.

25. Computer device comprising:
   memory means having program code stored therein for performing all the steps of a method according to any one of the claim 10, and
   an execution environment for executing said program code so as to carry out a method according to claim 10.

26. Computer device comprising:
   memory means having program code stored therein for performing all the steps of a method according to any one of the claim 18, and
   an execution environment for executing said program code so as to carry out a method according to claim 18.

* * * * *